B. F. Avery,
Bending Wood,
No 14,130.   Patented June 22, 1856.
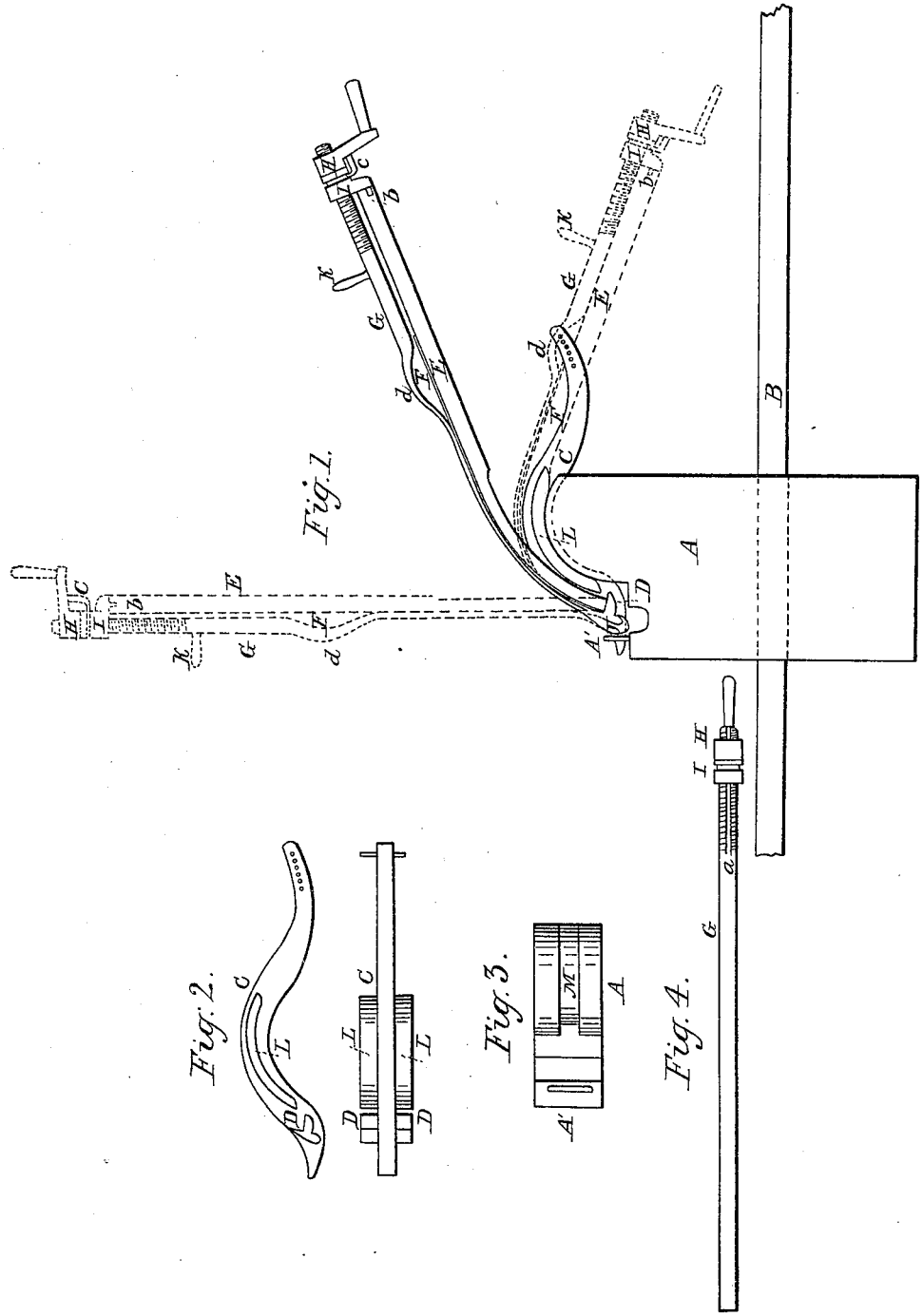

UNITED STATES PATENT OFFICE.

BENJAMIN F. AVERY, OF LOUISVILLE, KENTUCKY.

MACHINE FOR BENDING PLOW-HANDLES, &c.

Specification of Letters Patent No. 14,130, dated January 22, 1856.

*To all whom it may concern:*

Be it known that I, BENJAMIN F. AVERY, of Louisville, in the county of Jefferson and State of Kentucky, have invented certain new and useful Improvements in Apparatus for Bending Plow-Handles and other Similar Articles; and I do hereby declare that the same are described and represented in the following specification and drawings.

To enable others skilled in the art to make and use my improvements I will proceed to describe their construction and use, referring to the drawings in which the same letters indicate like parts in each of the figures.

Figure 1 is an elevation of my apparatus as applied to use; Fig. 2, the mold upon which the handles are bent shown in plan and elevation. Fig. 3, is the plan of the block in which the mold is placed to be used. Fig. 4, is a plan of the retaining spring bar.

The nature of my invention consists in a movable spring strap bar, provided with a hook or other device to connect or fasten it to the numerous molds upon which it is to be used, and a traversing or other stop to act against the end of the handle, to prevent the wood in the exterior portion of the curve bent, from being stretched, so as to break or fracture the grain of the wood. And in making a curve or score in the movable spring strap bar, for the purpose of applying a fastening over the bar or straight part of the handle bent. Also in applying a strap over that portion of the wood bent to keep the fibers of wood from rising during the process of drying.

In the above mentioned drawings A is a block firmly set in or fastened to the floor B, the top of the block being made in the form shown in Fig. 1, and provided with a strong staple A', to receive the end of the mold C, which mold may be made of cast iron in the form represented in Fig. 3, where a plan and elevation is shown removed from the block A. This mold is provided with a T shaped projection D, on each side to receive and hold the end of the handle E, and the end of the strap F, which is placed outside of the handle and retained upon it after it is bent until it is dry. The lower arm of the projection D is made to receive the hook on the end of the movable spring strap-bar G, which is shown in plan Fig. 4, which consists of a bar G, with a screw cut on the end for the nut H, which is provided with a crank handle to turn it and traverse the stop I, which is fitted to traverse over the screw and provided with a tongue to prevent it from turning which traverses in the groove *a*, Fig. 4. The stop I, projects on one side, so as to act against the end of the handle E and is provided with a spur *b*, to hold the end of the handle E, in its proper place against the stop I, which stop is provided with a score for the end of the stud *c*, which is fitted to it and fastened into the nut H, so as to draw the stop back by unscrewing the nut H.

The bar G is bent at *d*, so as to form a short curve so as to leave an open space between the bar and the strap and handle, to insert the pin *e*, over the strap and handle to hold them upon the mold until the handle is dried after it is bent. The bar G, should be made flat and of good steel about one inch and five-eighths wide and about one-sixteenth thick from near the curve *d*, to near the hook J which should be made as strong in proportion as shown in the drawing to hook onto the projection D as shown in Fig. 1. This bar G is also provided with a handle at K, to hold it up by pushing it over a yielding bar (which may be arranged for that purpose) after the hook J, is applied to the projection D.

The mold C, is made with flanges L, L, on each side curved so as to give the required form to the handles bent over them. It is also provided with a shank which is turned up and perforated with a series of holes as represented in Fig. 1, for the pins *e*, *e*, which are placed over the straps and handles to hold them in a proper position until they are dry. The under edge of the mold C, fits into the score M, in the top of the block A.

The apparatus having been constructed and completed as above described and a sufficient number of molds provided for the amount of work to be accomplished, so as to allow the handles sufficient time to dry on the molds before they are removed, so as to use the molds a second time, the operator places a mold upon the block and applies the hook J, to the projection D, and presses the handle K, over the yielding bar to hold the bar G, perpendicular while he puts the end of the strap F (which may be a thin strip of tough wood) into the projection D and the end of the handle also which is to be bent. He then places the upper end of the handle under the stop I, which is brought down upon it by turning the nut H, when the operator pulls the bar G, with the handle over the mold, so as to bend it over the flange L, and press the bar of the handle down so as to insert the pin e, over the strap and handle to hold them onto the mold until they are sufficiently dry to remain in the bent position when removed from the mold. After inserting the pin e, the operator can turn back the nut to release the stop and remove the bar G, and apply it to the other side of the mold and bend another handle on the opposite side of the mold in the manner just described, when the mold may be removed from the block with the handles and placed in a position to dry, while other molds are being filled in the same way. The ends of the handles to be bent should be properly boiled or steamed before they are bent upon the mold.

It will be apparent that my apparatus will be useful in bending other articles. With my apparatus one man, a common day laborer, can bend four hundred handles per day and do it better than on any other machine or apparatus. Besides my apparatus is far cheaper than any other and saves two-thirds of the labor ordinarily required in bending handles.

I believe I have described the construction, use and operation of my apparatus so as to enable any person skilled in the art to make and use it.

I will now specify what I desire to secure by Letters Patent, to wit:

1. I claim the strap G above described, constructed in any manner substantially the same, for the purposes set forth.

2. I also claim the combination and arrangement of the several devices constituting the machine, substantially as described.

BENJ. F. AVERY.

Witnesses:
J. DENNIS, Jr.,
JOHN S. HOLLINGSHEAD.